United States Patent [19]

Roderfeld et al.

[11] 4,367,756
[45] Jan. 11, 1983

[54] VIBRATION-FREE SELF-PROPELLING HARVESTER THRESHER

[75] Inventors: Heinrich Roderfeld; August Kampwerth, both of Harsewinkel, Fed. Rep. of Germany

[73] Assignee: Claas OHG, Harsewinkel, Fed. Rep. of Germany

[21] Appl. No.: 249,178

[22] Filed: Mar. 30, 1981

[30] Foreign Application Priority Data

Apr. 3, 1980 [DE] Fed. Rep. of Germany ....... 3013113

[51] Int. Cl.$^3$ .............................................. A01F 12/44
[52] U.S. Cl. ................................... 130/23; 130/30 C
[58] Field of Search ....................... 130/23, 22.1, 27 P, 130/27 Q, 30 C; 56/14.6

[56] References Cited

U.S. PATENT DOCUMENTS 779,808  1/1905  Schultz .................................. 130/23

FOREIGN PATENT DOCUMENTS 118121  2/1944  Australia ............................. 130/23

Primary Examiner—Jay N. Eskovitz
Attorney, Agent, or Firm—Michael J. Striker

[57] ABSTRACT

A vibration-free self-propelled harvester thresher has a threshing unit including a threshing drum and a threshing basket, a plurality of separating units each including a separating drum and a separating element located under the drum, and a device for jointly adjusting the separating elements in horizontal and vertical directions. The adjusting device includes two supporting elements on which the separating elements are mounted, guiding elements in which the supporting elements can slidingly displace in a horizontal direction, and walls provided with openings in which the guiding elements can be mounted adjustable in a vertical direction.

12 Claims, 3 Drawing Figures

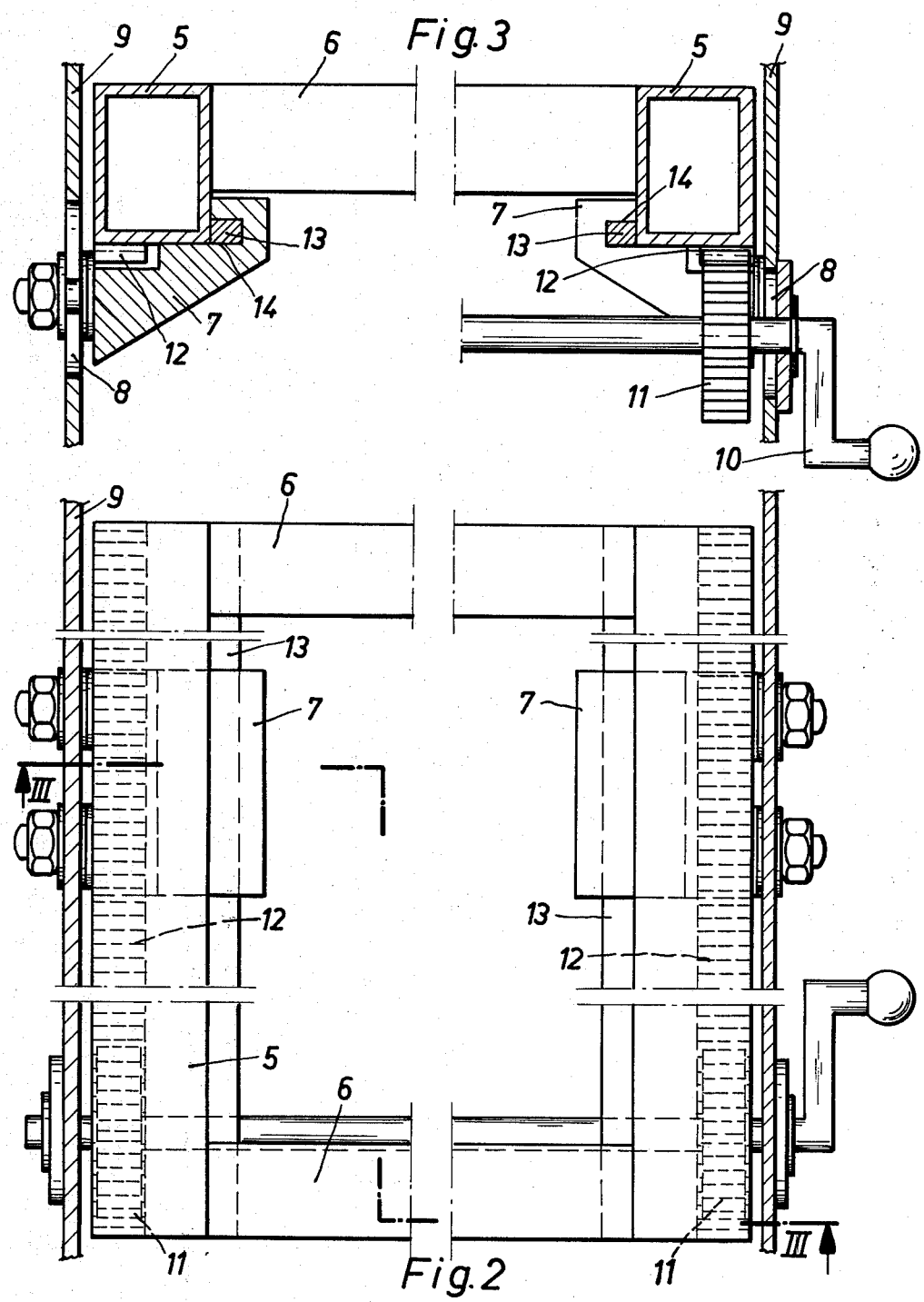

VIBRATION-FREE SELF-PROPELLING HARVESTER THRESHER

BACKGROUND OF THE INVENTION

The present invention relates to vibration-free self-propelling harvester threshers. Vibration-free self-propelling harvester threshers are known in the art. A known harvester thresher has a threshing drum associated with a threshing basket, and a plurality of parallel separating drums located behind the threshing drum in transporting direction and each provided with a separating element located thereunder. The separating elements are supported on two supporting elements which extend parallel and are connected with one another. The supporting elements extend in longitudinal direction of the harvester thresher and are mounted on the walls of the harvester thresher adjustable in a vertical direction.

This adjustment of the supporting elements is necessary to provide for smaller or greater adjustment of the separating elements relative to the stationary separating drums in dependence upon the climate conditions and upon types of fruits to be cultivated. Thereby grain rests can be finely removed, on the one hand, and clogging can be eliminated, on the other hand. It has been, however, shown in the practice that the vertical adjustment of the supporting elements can attain these objects only partially. The vertical adjustment is performed to such an extent that the necessary elimination of the clogging can be carried out with difficulties, on the one hand, and the vertical adjustment is not sufficient to provide optimum position of the separating elements relative to the separating drums.

SUMMARY OF THE INVENTION

Accordingly, it is an object of the present invention to provide a vibration-free self-propelling harvester thresher which avoids the disadvantages of the prior art.

More particularly, it is an object of the present invention to provide a vibration-free self-propelling harvester thresher which carries out an optimum adjustment of the supporting elements for separating elements in satisfactory manner.

In keeping with these objects and with others which will become apparent hereinafter, one feature of the present invention resides, briefly stated, in a vibration-free self-propelling harvester thresher in which the separating elements are jointly adjustable both in horizontal direction and in vertical direction.

When the harvester thresher is designed in accordance with the present invention, the distance between the separating drum and the associated separating element (the working gap) can be varied.

In accordance with another feature of the present invention, the separating elements are arranged on supporting elements which are displacable in guiding elements, wherein the guiding elements are mounted in elongated openings of the walls, adjustable in vertical direction.

In accordance with another advantageous feature of the present invention, at least one supporting element can be provided with a toothed rack which engages with a toothed gear driven in rotation with the aid of a crank.

A further feature of the present invention is that the supporting elements are provided with safety projections which slidingly move in longitudinal grooves of the guiding elements.

Finally the threshing basket of the machine is pivotally connected with the supporting elements and are jointly adjustable with the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a plan view of the threshing and separating part of the harvester thresher, with removed drums and separating elements; and FIG. 3 is a view showing a section of the inventive harvester thresher taken along the line III—III in FIG. 2.

DESCRIPTION OF A PREFERRED EMBODIMENT

Figure 1:
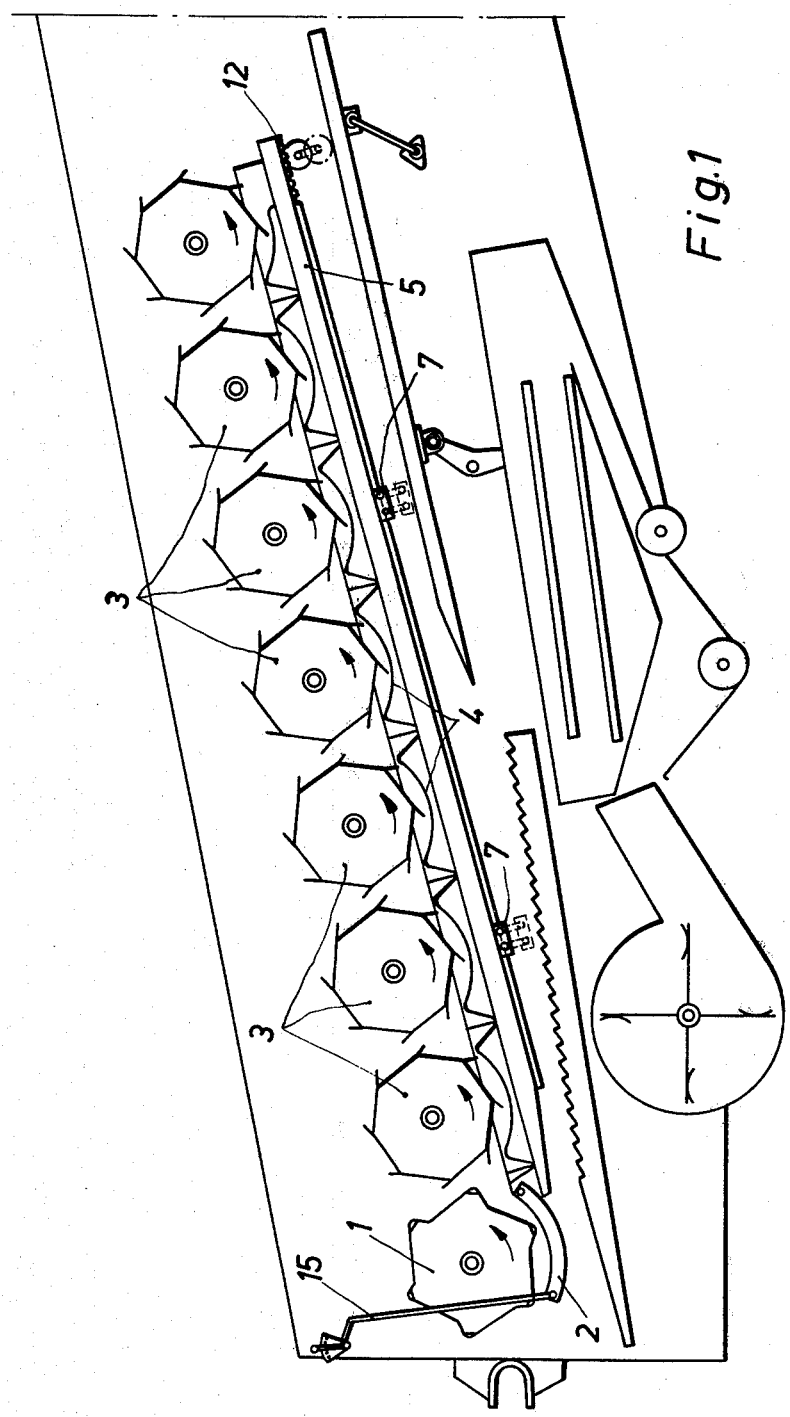
FIG. 1 is a side view of a threshing and separating part of a vibration-free self-propelling harvester thresher in accordance with the present invention.

A harvester thresher in accordance with the present invention has a threshing drum which is identified by reference numeral 1 and cooperates with a threshing basket 2 in a known manner. They form together a threshing unit of the inventive harvester thresher. A plurality of separating units are arranged behind the threshing unit as considered in transporting direction, and in succession one after the other. Each separating unit includes a separating drum 3 which is associated with a separating element 4 located under the separating drum.

Means is provided for supporting the separating elements 4. The supporting means includes two supporting elements 5 which extend parallel to one another substantially in the transporting direction of the harvester thresher. The separating elements 4 are connected with the supporting elements 5 by not shown means. The supporting elements 5 are connected with one another by transverse members 6 extending in direction which is transverse to the transporting direction.

The supporting elements 5 are displacably supported in guiding elements 7, and the latter are mounted on lateral walls 9 of the harvester thresher with the aid of openings 8. The openings 8 are elongated substantially in a vertical direction. The above-described construction is provided for adjusting the positions of the separating elements 4 as will be explained hereinbelow.

It is to be understood that the vertical position of the separating elements 4 can be adjusted by vertical displacement of the guiding element 7 relative to the lateral walls 9 with the aid of the elongated openings 8. The vertical adjustment of the separating elements 4 relative to the separating drums 3 is, however, not sufficient for attaining optimum matching to all climate conditions and fruit types. It is necessary for this purpose to adjust the supporting elements 5 also in a horizontal plane. For this purpose the supporting elements 5, as mentioned above, are arranged displacable in the guiding elements 7.

The adjustment of the supporting elements 5 in the horizontal direction is performed with the aid of a transmission which includes a toothed gear 11 rotatably mounted in the lateral walls 9 of the inventive harvester thresher. The toothed gear 11 is driven in rotation by a crank 10. The toothed gear 11 engages with two toothed racks 12 which are mounted on the supporting elements 5. When the crank 10 is actuated, the rotation of the toothed gear 11 is transmitted to the toothed racks 12 and thereby the supporting elements 5 can displace in horizontal direction relative to the guiding elements. This displacement may be performed, if necessary, to such an extent that the entire unit including the supporting elements and the separating elements can be withdrawn backwardly from the machine, for example for service or repair.

It is to be understood that the guiding elements 7 must be lowered in the elongated openings 8 only to such a distance that the separating elements do not collide with the separating drums during the above-mentioned withdrawal process. For preventing displacement of the supporting elements upwardly out of the guiding elements 7, safety members 13 are fixedly connected with the supporting elements 5. Grooves 14 are provided in the guiding elements 7. The safety members 13 of the supporting elements 5 slide with their free sides in the grooves 14 of the guiding elements 7.

When the harvester thresher is designed in accordance with the present invention, it is possible to adjust the supporting elements 5 and/or vertical direction and thereby provide optimum matching of the machine to all land requirements. Moreover, it is possible to eliminate clogging in a very easy manner by respective displacement of the unit 4, 5 including the supporting elements and the separating elements.

It is also possible to adjust the position of the threshing baskets 2 relative to the threshing drum 1. For this purpose not only the separating elements 4 are connected with the supporting elements 5, but also the threshing basket 2 is articulately connected at its one end with the supporting elements 5. The other end of the threshing basket 2 is suspended on an additional adjusting device 15, as can be seen at the left side of FIG. 1. This makes possible the adjustment of the position of the threshing basket 2.

It will be understood that each of the elements described above, or two or more together, may also find a useful application in other types of constructions differing from the types described above.

While the invention has been illustrated and described as embodied in a vibration-free self-propelling harvester thresher it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vibration-free self-propelled harvester thresher, comprising threshing means including a threshing drum and a thresh basket associated with one another; separating means including a plurality of separating drums and a plurality of separating elements each located under a respective one of said separating drums, said separating drums and elements being arranged behind said threshing means and successively one behind the other, as considered in a transporting direction; and single means for simultaneously and jointly adjusting said separating elements substantially in horizontal and vertical directions.

2. A harvester thresher as defined in claim 1; and further comprising means for jointly supporting said separating elements, said adjusting means being arranged to adjust said supporting means substantially in horizontal and vertical directions.

3. A vibration-free self-propelled harvester thresher, comprising threshing means including a threshing drum and a thresh basket associated with one another; separating means including a plurality of separating drums and a plurality of separating elements each located under a respective one of said separating drums, said separating drums and elements being arranged behind said threshing means and successively one behind the other, as considered in a transporting direction; means for jointly supporting said separating elements and including two supporting elements extending substantially in the transporting direction parallel to one another and connected with one another; guiding elements arranged so that said supporting elements can move relatively to said guiding elements substantially in a horizontal direction; and means for jointly adjusting said separating elements substantially in horizontal and vertical direction by adjusting said supporting means substantially in horizontal and vertical directions, said adjusting means being arranged to adjust said supporting elements relative to said guiding elements substantially in the horizontal direction.

4. A harvester thresher as defined in claim 3, and further comprising wall means having openings, said guiding elements being connected with said wall means through said openings so that said guiding elements can move relatively to said wall means substantially in a vertical direction, said adjusting means being arranged to adjust said guiding elements relative to said wall means substantially in the vertical direction.

5. A harvester thresher as defined in claim 4, wherein said openings are elongated in the vertical direction.

6. A harvester thresher as defined in claim 3, wherein said adjusting means has a gear transmission including two toothed members engaging with one another, one of said toothed members being connected with at least one of said supporting elements whereas the other of said toothed members is rotatable so as to act upon said one toothed member and thereby displace said supporting element relative to said guiding elements substantially in the horizontal direction.

7. A harvester thresher as defined in claim 6, wherein said one toothed member is a toothed rack, whereas said other toothed member is a toothed gear engaging with said toothed rack, said gear transmission further including a driving member which drives said toothed gear in rotation so as to displace said toothed rack and thereby said supporting elements substantially in the horizontal direction.

8. A harvester thresher as defined in claim 7, wherein said driving member is a crank connected with said toothed gear and operative for driving the latter in rotation.

9. A harvester thresher as defined in claim 4, wherein said adjusting means includes means for connecting said guiding elements with said opening of said wall means adjustably substantially in the vertical direction.

10. A harvester thresher as defined in claim 3, and further comprising means for preventing displacement of said supporting elements relative to said guiding element in the vertical direction.

11. A harvester thresher as defined in claim 10, wherein said preventing means include longitudinal grooves provided in said guiding elements, and safety members connected with said supporting elements and slidingly guided in said longitudinal grooves of said guiding elements.

12. A harvester thresher as defined in claim 11; and further comprising means for adjusting said thresh basket and including means for articulately connecting said thresh basket with said supporting elements, for joint adjustment with the latter.

* * * * *